J. A. STOLTMAN.
SAFETY STIRRUP.
APPLICATION FILED FEB. 28, 1911.
1,068,828.
Patented July 29, 1913.
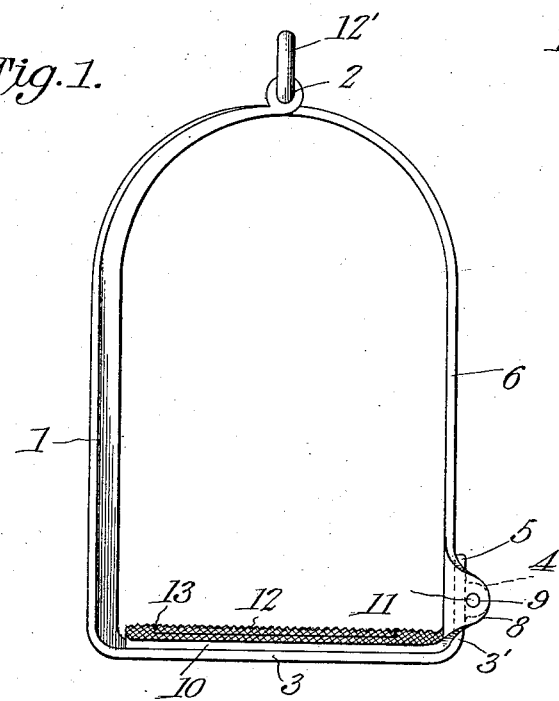
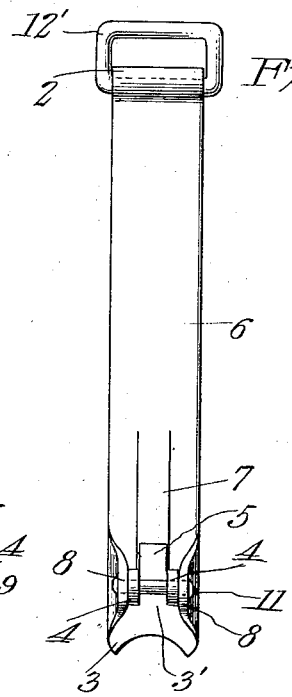
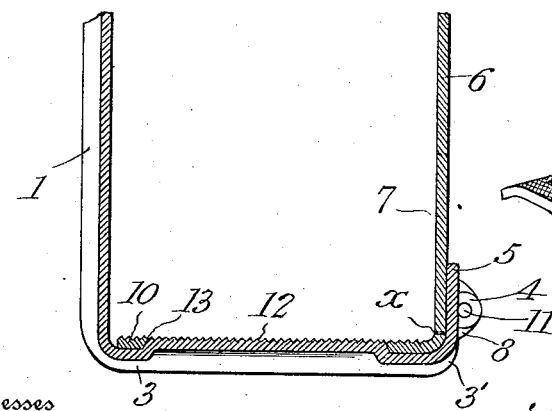
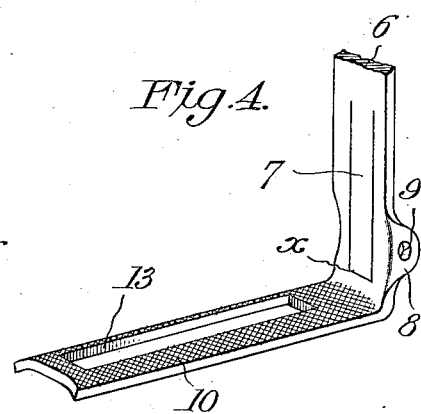
Witnesses
Fenton S. Belt
A. B. Farnham
Inventor
John A. Stoltman
By Geo. W. Sues
Attorney

UNITED STATES PATENT OFFICE.

JOHN AUGUST STOLTMAN, OF GRAFTON, NORTH DAKOTA.

SAFETY-STIRRUP.

1,068,828.     Specification of Letters Patent.     Patented July 29, 1913.

Application filed February 28, 1911. Serial No. 611,377.

*To all whom it may concern:*

Be it known that I, JOHN AUGUST STOLTMAN, a citizen of the United States, and a resident of Grafton, in the county of Walsh and State of North Dakota, have invented certain new and useful Improvements in Safety-Stirrups, of which the following is a specification, reference being had to the accompanying drawing.

The object of my invention is to provide a stirrup constructed to prevent the rider's foot hanging or catching after dismounting or in case the rider is thrown.

Another object is to provide a neat, sightly stirrup of the class known as safety stirrups which will be simple in construction and positive of action.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawing forming a part of this specification, and in which like numerals of reference indicate similar parts in the several views: Figure 1, shows an elevational view of a stirrup constructed according to my invention. Fig. 2, is a transverse sectional view through the stirrup. Fig. 3, is an end view, and Fig. 4, is a detached detail of the trip section of the stirrup.

The objection to most of the safety stirrups heretofore constructed is that they are of clumsy appearance and include operating mechanism likely to become disarranged, and for this reason have not been generally adopted by riders.

In my invention I provide a safety stirrup which is light and neat of construction and is free of any parts likely to become disarranged, and which includes a carrying member giving pivotal support to a trip section. The carrying member comprises the bow 1, ending in a loop eye 2, while from the opposite end of the bow, 1, is continued at practically right angles the tread bar 3. This tread bar is continued in the detent forming section 3′ held at right angles to the bow portion 1, and includes the upstanding head 5, being formed at the end of the tread bar and held parallel to the lower portion of the bow member 1. Two integral pin ears 4, are formed in spaced relation upon opposite sides at the base of the tongue 5, as clearly disclosed in Fig. 3. As shown in the drawing the bow portion 1, is curved transversely, as is also the tread portion 3, to add stiffness to the structure. This stirrup section is preferably made of stamped sheet steel and is of sufficient thickness to insure the tread member 3, being properly held when subjected to the maximum strain or load likely to be carried by a stirrup of this character.

In connection with the stirrup section described, I use what I term a trip section, a fragmentary detail of this section being shown in Fig. 4. This trip section includes the bow portion 6, which at its upper ends contacts with the eye 2 and is slit lengthwise as is shown at *x*, in Fig. 4, to provide the spring tongue 7. Adjacent to the end of the spring tongue 7, are positioned the two integral extending pin ears 8, each ear having a pin opening 9, while extending from what forms the lower portion of the bow 6, is the tread bar 10, having a suitable aperture 13, provided for the sake of lightness. As shown in Fig. 2, the tread bar 3, is provided with an upstanding web forming portion 12, which is roughened or serrated, and this upstanding portion 12, projects through the opening 13. The upper face of the tread bar 10, of the trip section of the stirrup is also roughened or serrated to insure the rider's foot forming a proper contact with the two tread bar sections of the stirrup.

The main or carrying stirrup section has secured to it a strap loop 12′, arranged to receive a suitable strap by means of which the stirrup is adjustably secured to the saddle. As shown in Fig. 3, this loop 12′, extends transversely to the tread bars so that my stirrup will also hang in a transverse position. The two stirrup sections are connected by means of a pin 11, and in their normal condition the outstanding head 5, contacts with the spring tongue 7. This head 5, contacts with the tongue 7, at a distance above the pivot point, thereby insuring the trip section of the stirrup always being in contact with the main or carrying section of the stirrup. The instrumentalities are so arranged that the tread portion 10, normally lies upon the tread portion 3, while the upper end of the bow 6, contacts with the loop eye 2. This gives the stirrup the appearance of being made in one piece. As shown in Fig. 3, the pin ears 8, of the trip section clasp the pin ears of the carrying member. Now, should through any accident the rider be thrown, as soon as the weight is removed from the tread portion 10, and applied to the bow portion 6, as would be the case should the rider's foot become hung, the bow section 6, will tilt outward operating against the tension of the spring tongue 7, thus permitting the ready escape of the rider's foot. This will also be the result should the rider's foot hang on dismounting. These stirrups are made in various sizes.

The stirrup is simple and inexpensive in construction and both durable and effective in operation.

Having thus described my said invention, what I claim as new and desire to secure by United States Letters Patent is:—

A stirrup having in combination, a bowed carrying member ending in a loop eye, a tread bar with an upstanding web being continued from the opposite end of said bowed member ending in an upstanding head at right angles to said tread bar, two integral pin ears being formed at the base of said head, a trip section including a tread bar having an aperture and arranged to lie over said first mentioned tread bar, said web portion extending through said aperture, said trip section ending in a bow portion at the upper end contacting with said loop eye, said trip section being slit to provide a spring tongue and having outstanding pin ears clasping said first mentioned pin ears, said head arranged to contact with said spring tongue, and a pin passing through all of said ears to pivotally connect said two stirrup members.

In testimony whereof I affix my signature, in presence of two witnesses.

JOHN AUGUST STOLTMAN.

Witnesses:
J. F. CURTIN,
ADAM J. SASS.

---

Copies of this patent may be obtained for five cents each, by addressing the "Commissioner of Patents, Washington, D. C."